April 24, 1962 R. M. BICKFORD 3,031,625

AUTOMATIC FREQUENCY CONTROL CIRCUIT

Filed Sept. 29, 1960

INVENTOR,
RICHARD M. BICKFORD

BY Harry M. Saragovitz

ATTORNEY.

United States Patent Office 3,031,625

Patented Apr. 24, 1962

3,031,625
AUTOMATIC FREQUENCY CONTROL CIRCUIT

Richard M. Bickford, Fullerton, Calif., assignor to the United States of America as represented by the Secretary of the Army Filed Sept. 29, 1960, Ser. No. 59,468
1 Claim. (Cl. 331—8)

This invention relates to automatic frequency control circuits and more particularly to a new and improved system for providing accurate and reliable frequency control of sweep or sawtooth generators used in television systems.

Prior to this invention, automatic frequency control systems providing the accuracy of the invention comprised a relatively large number of components and, as a result, were bulky and had high power consumption.

In accordance with this invention, the output of a blocking oscillator is fed to a sawtooth generator which supplies a signal to a transistor switch which picks off the instantaneous voltage from the generated sawtooth wave in response to an external synchronous pulse. The resultant voltage is supplied to another transistor to control the current flow therethrough accordingly. This control transistor is connected to the timing capacitor of the blocking oscillator and regulates its rate of charge to control the oscillator frequency and thus, in turn, regulates the sawtooth generator frequency.

Accordingly, it is a primary object of this invention to provide an accurate reliable, automatic frequency control circuit.

Another object of the invention is to provide an automatic frequency control circuit having low power consumption and relatively small size.

A more specific object of the invention is to provide an automatic frequency control circuit utilizing a transistor switch to synchronize a signal generating means with an external synchronous signal.

Further objects and features of the invention will become apparent upon consideration of the following detailed description taken in conjunction with the drawing in which.

Figure 1:
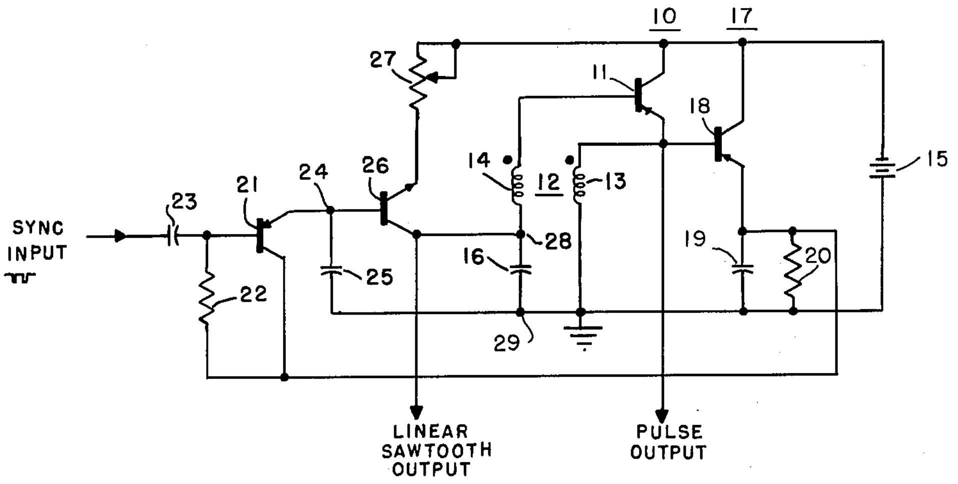
FIG. 1 shows a circuit diagram of a preferred embodiment of the invention.

Referring now to FIG. 1, there is shown a transistor blocking oscillator 10 including a PNP transistor 11 and a transformer 12 having a primary winding 13 and a feedback winding 14. The emitter of transistor 11 is connected to one end of primary winding 13, the other end of which is connected to the grounded positive terminal of a D.-C. power supply 15. A timing capacitor 16 is connected between one end of feedback winding 14 at junction 28 and the positive terminal of power supply 15 at junction 29. The other end of feedback winding 14 is connected to the base of transistor 11, the collector of which is connected to the negative terminal of power supply 15.

The output of blocking oscillator 10 is fed to a sawtooth generator 17 including a PNP transistor 18, a capacitor 19 and a resistor 20. The junction between winding 13 and the emitter of transistor 11 is connected to the base of transistor 18, and the junction between winding 13 and the positive terminal of power supply 15 is connected to the emitter of transistor 18 through a parallel circuit comprising capacitor 19 and resistor 20. The collector of transistor 18 is connected to the negative terminal of power supply 15. Sawtooth generator 17 generates a low impedance sawtooth wave in synchronism with the signal supplied to it from winding 13 of oscillator 10. This sawtooth wave is taken from the emitter of transistor 18 and is supplied to the collector of a PNP switching transistor 21. A synchronizing signal comprising a series of negative pulses at the desired operating frequency is applied to the base of transistor 21 through coupling capacitor 23. The emitter of transistor 21 is connected to one terminal 24 of a storage capacitor 25, the other terminal of which is connected to ground.

Terminal 24 is also connected to the base of an NPN regulating transistor 26. The emitter of transistor 26 is connected through a variable resistance 27 to the negative terminal of power supply 15, and the collector of transistor 26 is connected to junction 28 between winding 14 and timing capacitor 16. The waveform at junction 28 is a linear sawtooth wave and can be supplied to a suitable load (not shown). If a pulse output is desired, a suitable load could be connected to the junction of winding 13 and the emitter of transistor 11.

Figure 2:
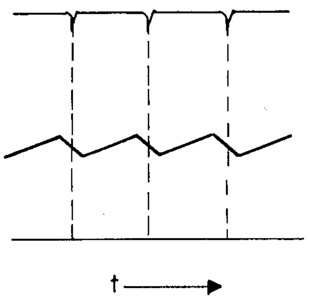
FIG. 2 shows waveforms useful in explaining the operation of the circuit of FIG. 1.

The operation of the circuit of FIG. 1 will now be described in conjunction with the waveforms shown in FIG. 2. Sweep generator 17 generates a sawtooth wave as shown in the lower waveform of FIG. 2 having a frequency determined by the frequency of the signal supplied by blocking oscillator 10. A sequence of negative synchronizing pulses as shown in the upper waveform of FIG. 2 are supplied to the base of transistor 21 which is normally non-conductive. At the time of occurrence of each synchronizing pulse, transistor 21 conducts and picks off a corresponding instantaneous voltage from the generated low impedance sawtooth waveform to charge storage capacitor 25 accordingly. Under normal operating conditions when the generated low impedance sawtooth wave and the synchronizing pulses are in synchronism, the voltage supplied to capacitor 25 will be that shown in FIG. 2 where the dotted lines intersect the sawtooth waveform.

The voltage present on capacitor 25 is applied to the base of transistor 26 as a biasing voltage therefor, and regulates the current flow through transistor 26 accordingly. Current flowing through transistor 26 is used to regulate the charging rate of timing capacitor 16 to, in turn, regulate the frequency of blocking oscillator 10. The normal operating voltage for junction 24 is determined by initially adjusting the point in the sawtooth waveform at which samples are to be taken and by adjusting variable resistor 27 to regulate the current flowing through transistor 26.

Now assume that the blocking oscillator frequency, and thus the low impedance sawtooth wave frequency, is low compared to the synchronizing frequency. Transistor switch 21 will then close when the sawtooth voltage is more positive and storage capacitor 25 will therefore charge more positively increasing the bias voltage on the base of regulating transistor 26, thereby causing transistor 26 to draw more current. This will cause the timing capacitor 16 to charge at a faster rate thereby increasing the frequency of oscillator 10. This increase in frequency is applied to sawtooth generator 17 and causes the frequency of the sawtooth wave produced therein to increase accordingly.

If the blocking oscillator frequency is high compared to the synchronizing frequency, transistor switch 21 will close when the sawtooth voltage is less positive. Storage capacitor 25 will therefore receive a lower charge which will cause regulating transistor 26 to draw less current. Timing capacitor 16 will therefore charge at a slower rate, thereby reducing the frequency of blocking oscillator 10 which then reduces the frequency of the sawtooth wave produced by generator 17.

It will be readily apparent to those skilled in the art that the PNP and NPN transistors used in FIG. 1 could be replaced by NPN and PNP transistors, respectively, by reversal of the voltage and diode polarities shown.

It is to be understood that the above-described circuit is merely illustrative of the principles of the invention and that various changes and modifications may be made without departing from the spirit and scope of the invention as set forth in the appended claim.

What is claimed is:

An automatic frequency control oscillator circuit comprising: a blocking oscillator and sawtooth generator including a first transistor and a second transistor, each transistor having an emitter, a base and a collector; a transformer having a first winding connected at one end to the base of said first transistor and a second winding inductively coupled to the first winding and connected between the emitter of said first transistor and ground, the emitter of said first transistor being coupled to the base of the second transistor; a voltage source having one terminal grounded and the other terminal connected to the collectors of said first and second transistors; a wave-shaping network comprising a parallel resistor and capacitor connected between the emitter of said second transistor and ground; synchronizing signal input means; a storage capacitor; a switching transistor having a base coupled to said synchronizing signal input means; an emitter coupled to ground through said storage capacitor, and a collector; means coupling the emitter of said second transistor to the collector of said switching transistor; a control transistor having a base coupled to the emitter of said switching transistor, and having a collector connected to the other end of said first winding; a timing capacitor connected between said other end of said first winding and ground; and a sawtooth output connection to the collector of said control transistor.

References Cited in the file of this patent

UNITED STATES PATENTS

| | | |
|---|---|---|
| 2,772,358 | Keen | Nov. 27, 1956 |
| 2,848,617 | Horowitz | Aug. 19, 1958 |

UNITED STATES PATENT OFFICE

CERTIFICATE OF CORRECTION

Patent No. 3,031,625 April 24, 1962

Richard M. Bickford

It is hereby certified that error appears in the above numbered patent requiring correction and that the said Letters Patent should read as corrected below.

Column 4, line 4, for "means;" read -- means, --.

Signed and sealed this 28th day of August 1962.

(SEAL)
Attest:

ESTON G. JOHNSON
Attesting Officer

DAVID L. LADD
Commissioner of Patents